(12) United States Patent
Kaneko

(10) Patent No.: US 11,164,297 B2
(45) Date of Patent: Nov. 2, 2021

(54) IMAGE PROCESSING DEVICE, IMAGE PROCESSING METHOD, AND COMPUTER-READABLE RECORDING MEDIUM FOR ENHANCING QUALITY OF AN IMAGE AFTER CORRECTION

(71) Applicant: NEC Corporation, Tokyo (JP)

(72) Inventor: Eiji Kaneko, Tokyo (JP)

(73) Assignee: NEC CORPORATION, Tokyo (JP)

(*) Notice: Subject to any disclaimer, the term of this patent is extended or adjusted under 35 U.S.C. 154(b) by 71 days.

(21) Appl. No.: 16/324,002

(22) PCT Filed: Aug. 9, 2017

(86) PCT No.: PCT/JP2017/028903
§ 371 (c)(1),
(2) Date: Feb. 7, 2019

(87) PCT Pub. No.: WO2018/037920
PCT Pub. Date: Mar. 1, 2018

(65) Prior Publication Data
US 2019/0180429 A1 Jun. 13, 2019

(30) Foreign Application Priority Data

Aug. 26, 2016 (JP) .............................. JP2016-165819

(51) Int. Cl.
*G06K 9/00* (2006.01)
*G06T 5/50* (2006.01)
*G06T 7/00* (2017.01)

(52) U.S. Cl.
CPC .............. *G06T 5/50* (2013.01); *G06T 7/0002* (2013.01); *G06T 2207/20021* (2013.01);
(Continued)

(58) Field of Classification Search
CPC ..................... G06T 5/50; G06T 7/0002; G06T 2207/20021; G06T 2207/20076;
(Continued)

(56) References Cited

U.S. PATENT DOCUMENTS

2005/0175253 A1* 8/2005 Li ............................. G06T 5/50
382/260
2014/0341481 A1* 11/2014 Panetta ..................... G06T 5/50
382/274
2019/0026532 A1* 1/2019 Feingersh .......... G06K 9/00697

FOREIGN PATENT DOCUMENTS

JP 2011-87087 A 4/2011
JP 2013-58859 A 3/2013
(Continued)

OTHER PUBLICATIONS

Extended European Search Report dated Jul. 9, 2019 from European Patent Office by the European Patent Application No. 17843405.6.
(Continued)

*Primary Examiner* — Andrew M Moyer

(57) ABSTRACT

To improve image quality of an image after correction, An image processing device 100 includes: a correction unit 110 for generating a plurality of correction images from an image by using a plurality of correction methods; an evaluation unit 120 for evaluating the image or each of the plurality of correction images for each of areas constituting the image or the correction image; and a synthesis unit 130 for synthesizing the plurality of correction images according to an evaluation result by the evaluation unit 120.

8 Claims, 7 Drawing Sheets

(52) U.S. Cl.
CPC ............ *G06T 2207/20076* (2013.01); *G06T 2207/20221* (2013.01); *G06T 2207/30168* (2013.01); *G06T 2207/30192* (2013.01)

(58) Field of Classification Search
CPC . G06T 2207/20221; G06T 2207/30168; G06T 2207/30192
USPC .......................................... 382/254, 260, 274
See application file for complete search history.

(56) References Cited

FOREIGN PATENT DOCUMENTS

| | | |
|---|---|---|
| JP | 2013-143033 A | 7/2013 |
| WO | WO 03/069558 A1 | 8/2003 |
| WO | WO 2011/122284 A1 | 10/2011 |
| WO | WO 2015/179528 A1 | 11/2015 |

OTHER PUBLICATIONS

C. Pohl et al. "Review article Multisensor image fusion in remote sensing: Concepts, methods and applications" International Journal of Remote Sensing 1998, vol. 19, No. 5, 823-854.

International Search Report dated Sep. 12, 2017, in corresponding PCT International Application.

Xu et al.; "Thin Cloud Removal Based on Signal Transmission Principles and Spectral Mixture Analysis", IEEE Transactions on Geoscience and Remote Sensing, vol. 54, No. 3, p. 1659-1669, (Mar. 2016).

He et al.; "Single Image Haze Removal Using Dark Channel Prior", IEEE Transactions on Pattern Analysis and Machine Intelligence, vol. 33, No. 12, pp. 2341-2353, (Dec. 2011).

Tanaka et al.; "Data-Dependent Inverse Halftoning Employing LUT and Linear Smoothing", The Technical Study Report of The Institute of Electronics, Information and Communication Engineers, vol. 108, No. 461, pp. 31-36, (Feb. 2009); in particular, "3. Proposed method", Fig. 2.

* cited by examiner

IMAGE PROCESSING DEVICE, IMAGE PROCESSING METHOD, AND COMPUTER-READABLE RECORDING MEDIUM FOR ENHANCING QUALITY OF AN IMAGE AFTER CORRECTION

CROSS-REFERENCE TO RELATED PATENT APPLICATIONS

This application is a National Stage Entry of International Application No. PCT/JP2017/028903, filed Aug. 9, 2017, which claims priority from Japanese Patent Application No. JP 2016-165819, filed Aug. 26, 2016. The entire contents of the above-referenced applications are expressly incorporated herein by reference.

TECHNICAL FIELD

The present invention relates to image processing.

BACKGROUND ART

In image processing, there are various correction methods aimed at accurately acquiring original information from an image containing noise and the like. For example, NPL 1 and NPL 2 disclose techniques for removing cloud and haze (such as fog and smoke) from images taken.

CITATION LIST

Non Patent Literature

[NPL 1] Meng Xu, Mark Pickering, Antonio J. Plaza and Xiuping Jia, "Thin cloud removal based on signal transmission principles and spectral mixture analysis", IEEE Transactions on Geoscience and Remote Sensing, Vol. 54, No. 3, pp. 1659-1669, March 2016,
[NPL 2] Kaiming He, Jian Sun and Xiaoou Tang, "Single image Haze Removal Using Dark Channel Prior", IEEE Transactions on Pattern Analysis and Machine Intelligence, Vol. 33, No. 12, pp. 2341-2353, December 2011

SUMMARY OF INVENTION

Technical Problem

Quality of correction in image processing depends on a correction method used for the correction in some cases. For example, when the method described in NPL 1 is used, there is a possibility that accuracy of correction degrades in a scene containing many types of pure substances. Further, when the method described in NPL 2 is used, there is a possibility that accuracy degrades in a scene in which dark pixels, such as a shadow, do not exist.

The present disclosure therefore provides a technique that improves image quality of an image after correction.

Solution to Problem

In one aspect, there is provided an image processing device including: a correction means for generating a plurality of correction images from an image by using a plurality of correction methods; an evaluation means for evaluating the image or each of the plurality of correction images for each of areas constituting the image or the correction image; and a synthesis means for synthesizing the plurality of correction images according to an evaluation result by the evaluation means.

In another aspect, there is provided an image processing method including: generating a plurality of correction images from an image by using a plurality of correction methods; evaluating the image or each of the plurality of correction images for each of areas constituting the image or the correction image; and synthesizing the plurality of correction images according to an evaluation result.

In yet another aspect, there is provided a computer-readable recording medium on which a program is non-transitorily stored, the program causing a computer to execute: processing of generating a plurality of correction images from an image by using a plurality of correction methods; processing of evaluating the image or each of the plurality of correction images for each of areas constituting the image or the correction image; and processing of synthesizing the plurality of correction images according to an evaluation result.

Advantageous Effects of Invention

According to the present disclosure, image quality of an image after correction is improved.

EXAMPLE EMBODIMENT

First Embodiment

Figure 1:
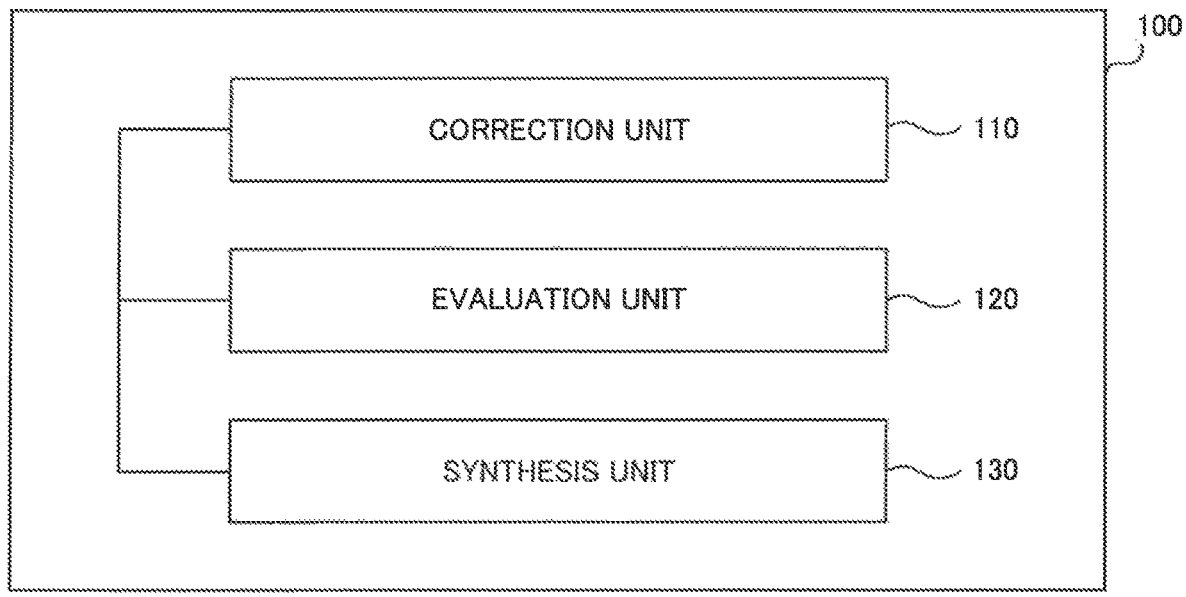
FIG. 1 is a block diagram illustrating an example of a configuration of an image processing device.

FIG. 1 is a block diagram illustrating a configuration of an image processing device 100 according to a first example embodiment. The image processing device 100 includes at least a correction unit 110, an evaluation unit 120, and a synthesis unit 130. The image processing device 100 may include a configuration other than the correction unit 110, the evaluation unit 120, and the synthesis unit 130.

An image according to the present example embodiment is represented using a plurality of pixels. Each pixel includes at least pixel information. The pixel information is information that characterizes each pixel. The pixel information represents brightness and a color of a pixel by a predetermined number of bits, for example. An image according to the present example embodiment may be any of a monochrome image or a color image. Resolution of an image is not limited or restricted to a specific value.

The correction unit 110 corrects images. The correction unit 110 corrects one image by using a plurality of correction methods. The correction unit 110 generates n images by using n types of correction methods, such as a first image corrected by using a first correction method, a second image corrected by using a second correction method that is different from the first correction method. A value of n herein is not specifically limited as long as the value is an integer greater than or equal to 2.

An image corrected by the correction unit 110 will hereinafter also be referred to as a "correction image". An image before correction by the correction unit 110 will hereinafter also be referred to as an "original image". An original image herein only needs to be an image to which correction by the correction unit 110 is not applied and does not necessarily need to be an image to which no modification is made taken image itself, for example).

For example, the correction unit 110 generates a plurality of correction images by using a plurality of different correction algorithms. Alternatively, the correction unit 110 may generate a plurality of correction images by using the same correction algorithm and changing a parameter used in the algorithm. A parameter herein means a parameter that affects the image quality of a correction image. The quality of a correction image means exactness (fidelity) of information that can be read from the correction image or the accuracy of correction.

In some aspects, the evaluation unit 120 evaluates a correction image generated by the correction unit 110. The evaluation unit 120 evaluates each of a plurality of correction images generated by the correction unit 110 for each of areas constituting the correction image. For example, the evaluation unit 120 calculates an evaluation value that indicates the image quality for each of areas of the correction image by using a predetermined criterion. An evaluation value herein may be superiority or inferiority of image quality expressed by a binary value or may be image quality expressed in more detailed levels, such as 10 levels, 100 levels, or the like.

Alternatively, the evaluation unit 120 may evaluate an original image for each area. In other words, evaluation by the evaluation unit 120 may be performed on a correction image or on an original image. For example, the evaluation unit 120 may evaluate an attribute (such as a scene) of an original image for each area. The evaluation unit 120 evaluates an original image based on pixel information, for example.

An area herein may be an area with a fixed shape resulting from equally dividing an image or may be an area with an unfixed shape resulting from classifying an image based on a certain feature (such as a feature amount of the image). For example, the evaluation unit 120 may evaluate an original image or a correction image for each pixel.

Alternatively, the evaluation unit 120 may evaluate an original image or a correction image for each block made up of a plurality of pixels.

The synthesis unit 130 synthesizes a plurality of correction images generated by the correction unit 110. An image after synthesis by the synthesis unit 130 will hereinafter also be referred to as a "synthesized image". Synthesis herein means image processing that combines two or more images into one image. The synthesis unit 130 outputs a synthesized image by using m correction images out of n correction images (where 2≤m≤n) generated by the correction unit 110.

The synthesis unit 130 synthesizes correction images in accordance with a result of evaluation by the evaluation unit 120. For example, the synthesis unit 130 generates a synthesized image by using a plurality of correction images and combining areas that have higher evaluation values together. Alternatively, the synthesis unit 130 may generate a synthesized image by calculating (such as adding) pieces of pixel information of a plurality of correction images, based on evaluation its values. Further, when the evaluation unit 120 evaluates an attribute of an original image for each area, the synthesis unit 130 may generate a synthesized image to which a correction image according to an attribute of each area is applied in the area.

Note that the image processing device 100 may omit execution of synthesis by the synthesis unit 130 in some cases. For example, when the evaluation unit 120 evaluates that the image quality of a correction image corrected by a particular correction method is generally higher than the image quality of other correction images, the image processing device 100 may output the correction image corrected by the particular correction method, instead of a synthesized image.

Figure 2:
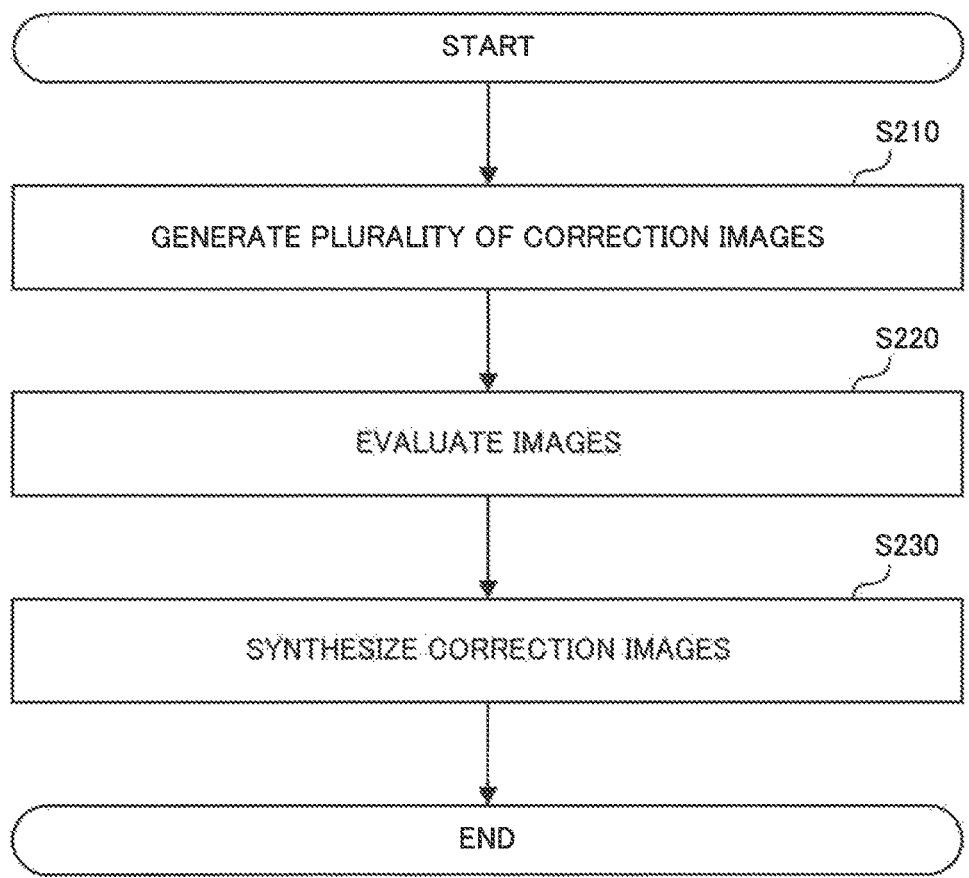
FIG. 2 is a flowchart illustrating an example of an image processing method.

FIG. 2 is a flowchart illustrating an image processing method according to the present example embodiment. The image processing device 100 executes processing in accordance with a procedure following the flowchart illustrated in FIG. 2. The image processing device 100 can start execution of the processing at a timing such as a timing at which an image is input or a timing specified by a user.

In step S210, the correction unit 110 generates a plurality of correction images by applying a plurality of correction methods to an original image. In step S220, the evaluation unit 120 evaluates the original image or the correction images for each area. In step S230, the synthesis unit 130 synthesizes the correction images in accordance with a result of the evaluation in step S220 and outputs the synthesized image.

As described above, the image processing device 100 according to the present example embodiment has a configuration that synthesizes correction images on an area-by-area basis based on a result of evaluation of the original image or the correction images. This configuration enables output of an image that reflects corrections made by a plurality of correction methods instead of only a single correction method. Accordingly, the image processing device 100 is capable of improving the image quality of an output image after correction as compared with a case without such a configuration.

Second Example Embodiment

Figure 3:
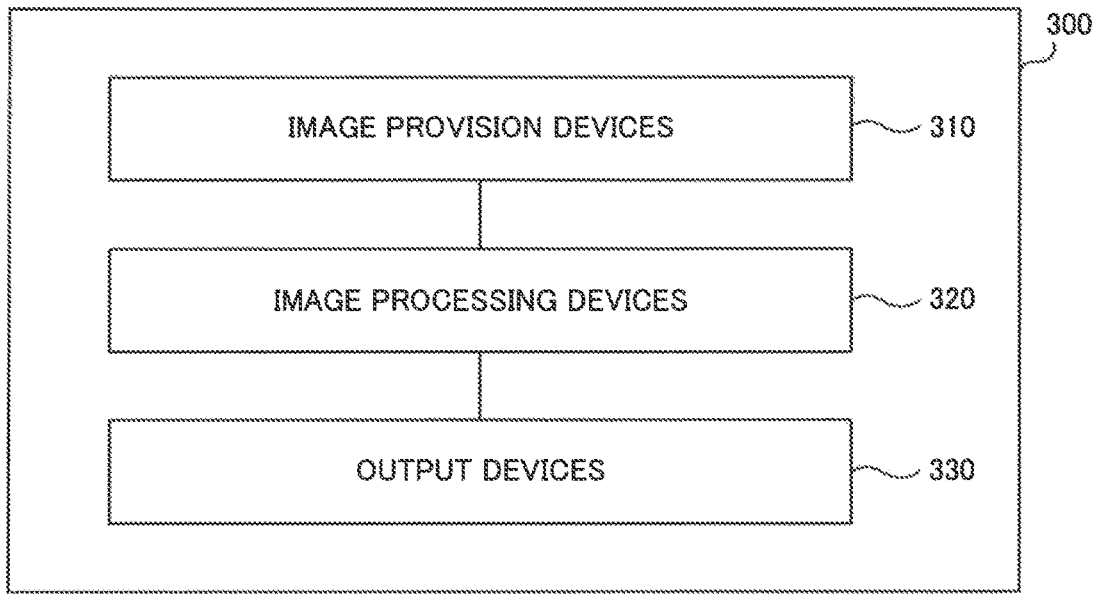
FIG. 3 is a block diagram illustrating an example of a configuration of an image processing system.

FIG. 3 is a block diagram illustrating a configuration of an image processing system 300 according to another example embodiment. The image processing system 300 includes an image provision device 310, an image processing device 320, and an output device 330. The present example embodiment corresponds to an example of applying, to remote sensing, the image processing device 100 according to the first example embodiment.

The image provision 310 provides observational data representing an observation image to the image processing device 320. The image provision device 310 is a database in which observational data are stored, for example. The image processing device 320 corrects an observation image and performs synthesis, based on observational data provided from the image provision device 310. The output device 330 outputs a synthesized image synthesized by the image processing device 320. The output device 330 is a display device that displays a synthesized image, for example. Further, the output device 330 may be a recording device that records image data representing a synthesized image on a recording medium.

Observational data in the present example embodiment includes at least spectrum information in a plurality of wavebands. The spectrum information is a brightness value (or another value from which a brightness value can be calculated), for example. The spectrum information corresponds to one example of pixel information in the first example embodiment. Further, observational data may include meta information. The meta information is, for example, date and time of observation, position on a ground surface (latitude and longitude), solar zenithal angle, water vapor content, ambient temperature, solar azimuthal angle, zenithal angle and azimuthal angle of an artificial satellite, and the like.

In the present example embodiment, an observation image means an image of a ground surface taken from the sky. For example, an observation image is an image represented by electromagnetic waves in a plurality of wavebands observed by an information gathering satellite such as an optical satellite. Such an observation image is also commonly called a multispectral image or a hyperspectral image. However, the number of wavebands (hereinafter also referred to as the "number of bands") representing an observation image is not limited to a specific value. Further, the upper and lower limits of wavebands representing an observation image are not limited to specific values and the wavebands may include wavebands of invisible light.

A ground surface herein means a surface of the Earth and is not necessarily limited to lands. Further, while an observation image is taken for the purpose of observing a ground surface, an object that inhibits observation of the ground surface may appear in the observation image. An example of such an object is cloud in the atmosphere. In the present example embodiment, the image processing device 320 performs correction for reducing or removing an effect of clouds on an observation image, i.e., screening or the like by clouds to an image that should originally represent a ground surface.

Figure 4:
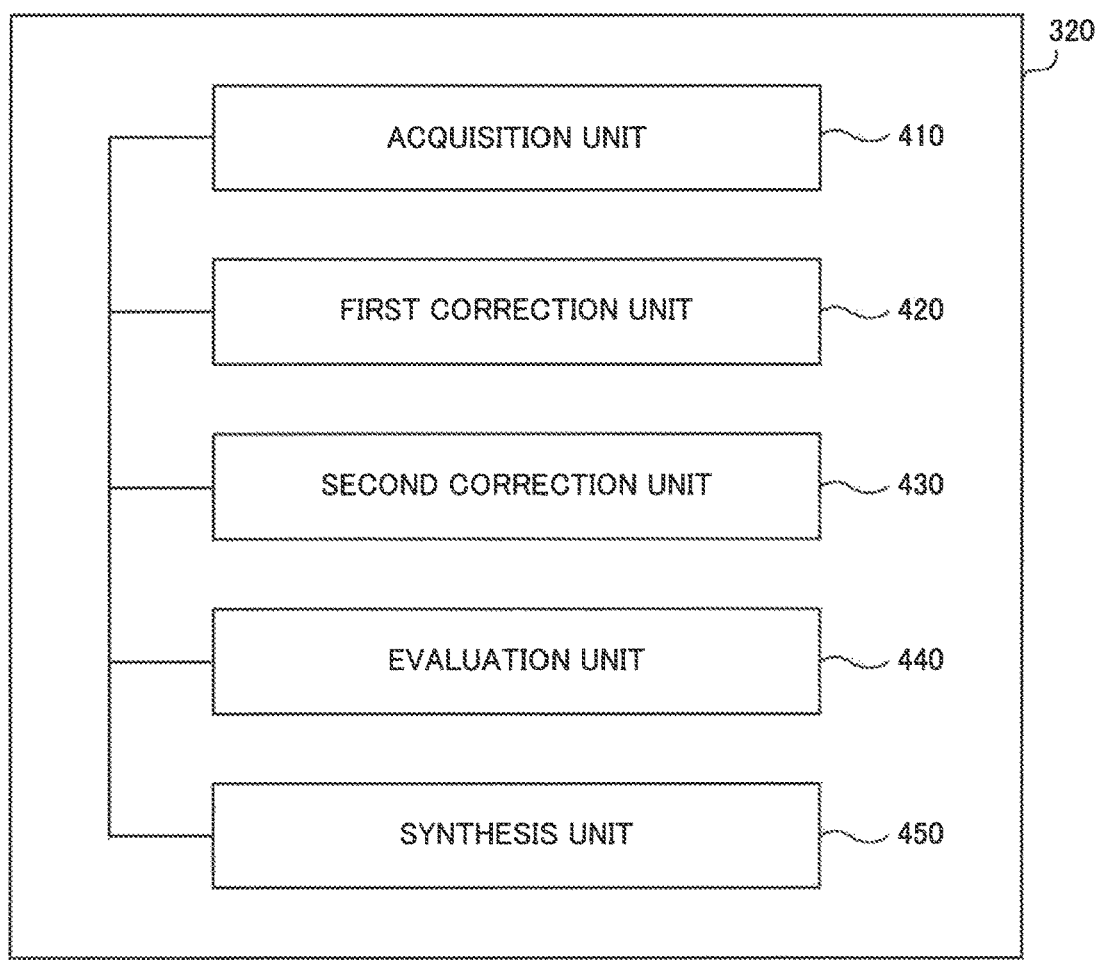
FIG. 4 is a block diagram illustrating another example of a configuration of an image processing device.

FIG. 4 is a block diagram illustrating a more detailed configuration of the image processing device 320. The image processing device 320 includes an acquisition unit 410, a first correction unit 420, a second correction unit 430, an evaluation unit 440, and a synthesis unit 450. Among these units, the first correction unit 420 and the second correction unit 430 correspond to an example of the correction unit 110 according to the first example embodiment. Further, the evaluation unit 440 corresponds to an example of the evaluation unit 120 according to the first example embodiment. The synthesis unit 440 corresponds to an example of the synthesis unit 130 according to the first example embodiment.

The acquisition unit 410 acquires observational data. The acquisition unit 410 provides observational data provided from the image provision device 310 to the first correction unit 420 and the second correction unit 430. In other words, it can also be said that the acquisition unit 410 allocates observational data between the first correction unit 420 and the second correction unit 430.

The first correction unit 420 corrects an observation image. The first correction unit 420 corrects an observation image by using a so-called Unmixing method. One example of an image correction method based on the Unmixing method is described in NPL 1. The first correction unit 420 provides image data (spectrum information) representing a correction image to the synthesis unit 450. Further, the first correction unit 420 provides, to the evaluation unit 440, evaluation information to be used for evaluation by the evaluation unit 440.

Figure 5:
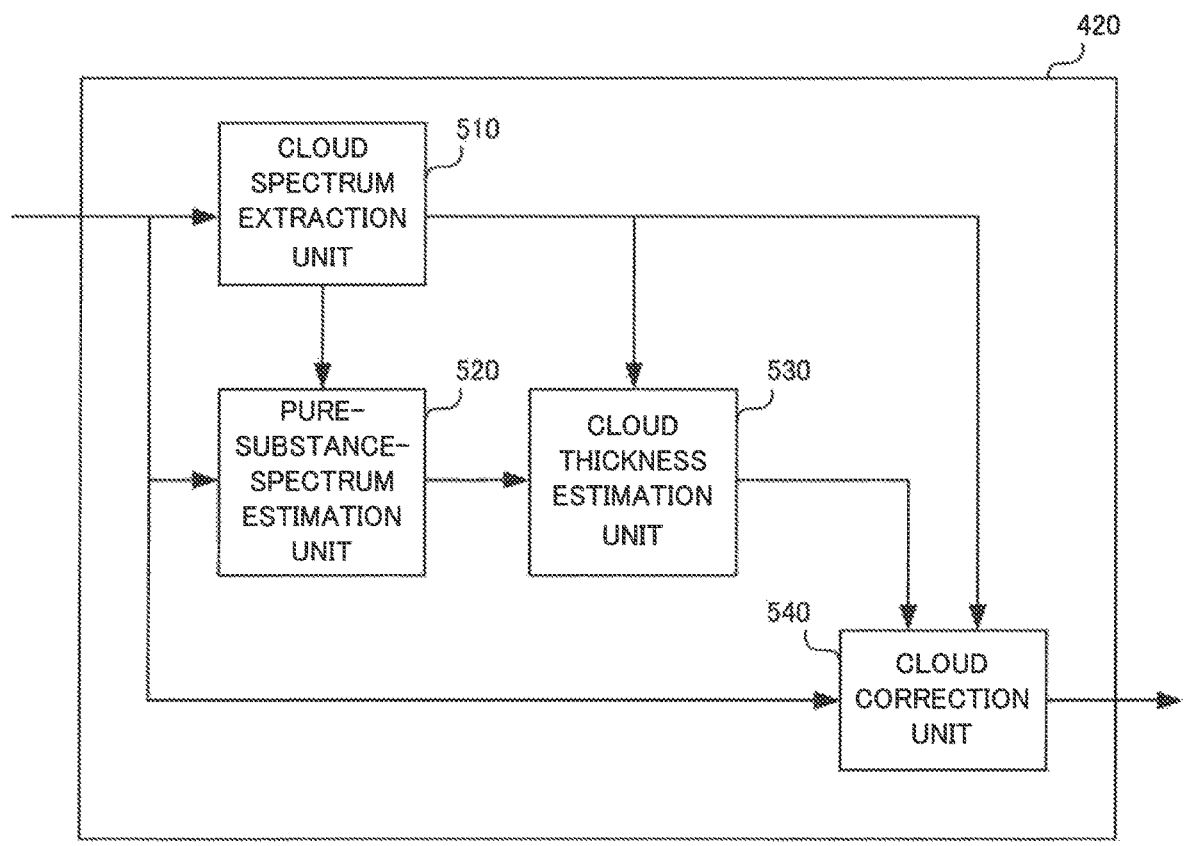
FIG. 5 is a block diagram illustrating an example of a configuration of a first correction unit.

FIG. 5 is a block diagram illustrating a configuration of the first correction unit 420. The first correction unit 420 includes a cloud spectrum extraction unit 510, a pure-substance-spectrum estimation unit 520, a cloud thickness estimation unit 530, and a cloud correction unit 540. Note that arrows between blocks illustrated in the block diagrams in FIG. 5 and subsequent drawing indicate flows of specific information for convenience and are not intended to limit information and flows of the information.

The cloud spectrum extraction unit 510 extracts a cloud spectrum from an observation image. A cloud spectrum herein means a spectrum of a pixel that corresponds to cloud in an observation image. It can also be said that a cloud spectrum is a spectrum of a pixel in an observation image that is most affected by clouds. The cloud spectrum extraction unit 510 regards the spectrum of a brightest pixel, for example, in an observation image as a cloud spectrum. Specifically, the cloud spectrum extraction unit 510 calculates the sum of brightness values for each band with regard to each pixel included in an observation image and regards the spectrum of a pixel with the largest calculated sum as a cloud spectrum.

The pure-substance-spectrum estimation unit 520 estimates a pure substance spectrum based on an observation image and a cloud spectrum. A pure substance spectrum herein means a spectrum of a pure substance that constitutes a ground surface. The pure substances are components when a ground surface is classified into some of the components and also called as endmembers. Such a pure substance may be a chemical substance (an elementary substance or a compound) or may correspond to each of scenes when a ground surface is classified into some of the scenes (such as water, soil, vegetation, and an artificial object). The types and number of pure substances are not specifically limited.

Reflected light that is observed as sunlight enters and reflects on a certain area of a ground surface varies depending on a pure substance that constitutes the area. When the area contains a plurality of pure substances, reflected light from the area varies according to proportions of the plurality of pure substances. Further, it is possible that reflected light observed when clouds appear over the sky of the area contains not only reflected light from the area (i.e., the ground surface) but also reflected light from the clouds (see FIG. 3 in NPL 1, for example).

The pure-substance-spectrum estimation unit 520 assumes that the number of types of pure substances that constitute the ground surface is sufficiently small, and estimates a pure substance spectrum expected from measured spectrum information and a cloud spectrum extracted by the cloud spectrum extraction unit 510. Specifically, the pure-substance-spectrum estimation unit 520 assumes that the total number of pure substances in each area is less than or equal to the number of bands. The pure-substance-spectrum estimation unit 520 may use a well-known Unmixing method, such as Vertex Component Analysis (VCA), N-FINDER, Pixel Purity Index (PPI), or Minimum Volume Transformation (MVT), for pure substance spectrum estimation.

The cloud thickness estimation unit 530 estimates cloud thickness, i.e., the thickness (the width in the height direction) of cloud for each pixel. The cloud thickness estimation unit 530 estimates cloud thickness by using a cloud spectrum extracted by the cloud spectrum extraction unit 510 and a pure substance spectrum estimated by the pure-substance-spectrum estimation unit 520. For example, the cloud thickness estimation unit 530 calculates $a_c$ and $a_m$ that minimize the norm of a model error e, based on an observation model expressed by Equation (1) given below, in other words, the cloud thickness estimation unit 530 calculates cloud thickness for each pixel by solving an optimization problem expressed by Equation (1).

[Math. 1]

$$x_0 = a_c s_c + \sum_{m=1}^{M} a_m s_m + e \quad (1)$$

Note that in Equation (1),
$x_o$: spectrum information of each pixel in an observation image,
$a_c$: weighting coefficient (abundance) of a cloud spectrum,
$s_c$: cloud spectrum,
$a_m$: weighting coefficient of a component of a pure substance spectrum,
$s_m$: component of the pure substance spectrum
M: the number of components of the pure substance spectrum, and
e: model error.

Further, the spectrum information $x_o$, the cloud spectrum $s_c$, and the component of the pure substance spectrum $s_m$ are vectors having as many elements as the number of bands. The spectrum information $x_o$ represents radiance of a plurality of bands by using a vector.

The first term on the right-hand side of Equation (1) indicates the effect of the cloud on the spectrum information $x_o$. In the first term on the right-hand side, the weighting coefficient $a_c$ is a coefficient that increases as cloud gets thicker and decreases as cloud gets thinner. For example, the weighting coefficient $a_c$ has a maximum value, "1", in a pixel that corresponds to a cloud spectrum, and becomes closer to a minimum value, "0", with a pixel of thinner cloud. The cloud spectrum $s_c$ corresponds to spectrum information extracted by the cloud spectrum extraction unit 510. The pure substance spectrum (the second term on the right-hand side) can be obtained by subtracting the effect of the cloud (the first term on the right-hand side) from the spectrum information $x_o$, as seen from Equation (1).

The cloud thickness estimation unit 530 can calculate the weighting coefficients $a_c$ and $a_m$ that minimize the norm of the model error e for each pixel by solving the optimization problem expressed by Equation (1). Based on the weighting coefficient $a_c$ for each pixel, the cloud thickness estimation unit 530 can estimate the thickness of cloud in each pixel of the observation image.

The cloud correction unit 540 corrects an observation image. The cloud correction unit 540 corrects the observation image by using a cloud spectrum extracted by the cloud spectrum extraction unit 510 and cloud thickness estimated by the cloud thickness estimation unit 530, in such a way that the effect of cloud is subtracted from the observation image. The cloud correction unit 540 generates a correction image in which each pixel is corrected in accordance with the cloud thickness estimated by the cloud estimation unit 530. The correction image output from the first correction unit 420 is hereinafter also referred to as "first correction image".

The second correction unit 430 is common with the first correction unit 420 in that the second correction unit 430 corrects an observation image, but differs from the first correction unit 420 in a correction method for correcting the observation image. The correction method by the second correction unit 430 is based on a method described in NPL 2. The method described in NPL 2 is a method aimed at dehazing, i.e., removing haze. The second correction unit 430 applies the method to removal of clouds. The second correction unit 430 provides image data (spectrum information) representing a correction image to the synthesis unit 450. Further, the second correction unit 430 provides evaluation information to be used in evaluation by the evaluation unit 440 to the evaluation unit 440.

Figure 6:
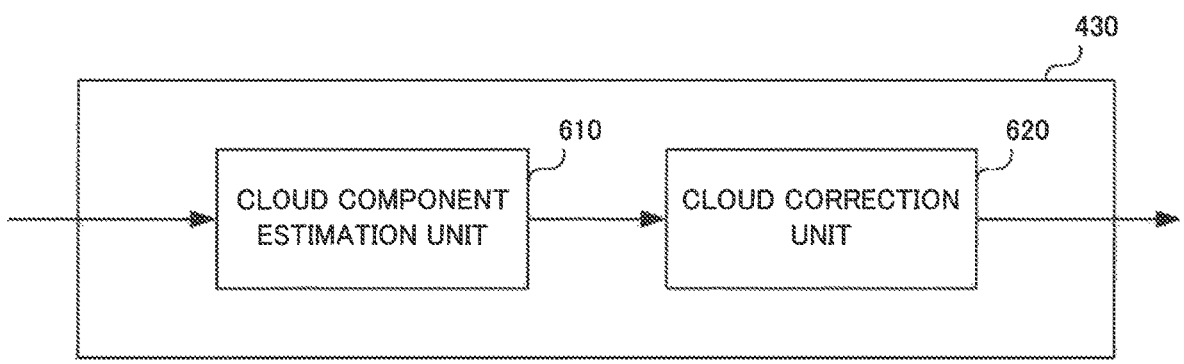
FIG. 6 is a block diagram illustrating an example of a configuration of a second correction unit.

FIG. 6 is a block diagram illustrating a configuration of the second correction unit 430. The second correction unit 430 includes a cloud component estimation unit 610 and a cloud correction unit 620.

The cloud component estimation unit 610 estimates a cloud component for each pixel. The cloud component estimation unit 610 estimates a cloud component, based on spectrum information of each pixel in a small area (also referred to as a window or a patch) smaller in size (15×15 pixels, for example) than an observation image. Specifically, the cloud component estimation unit 610 assumes that the small area contains a certain amount of clouds and that the smallest brightness value in a predetermined band in the small area is attributable to the clouds. Then, the cloud component estimation unit 610 regards the smallest brightness value as a cloud component of a pixel in a predetermined position (the center, for example) in the small area. The cloud estimation unit 610 performs similar estimation in sequence by shifting the position of the small area and thereby enabling to estimate cloud components of all pixels in the observation image.

The cloud correction unit 620 corrects an observation image by using cloud components estimated by the cloud component estimation unit 610. The cloud correction unit 620 generates a correction image in which the effect of cloud is removed from the observation image, in a way similar to the haze removal described in NPL 2. The correction image output from the second correction unit 430 is hereinafter also referred to as a "second correction image".

The evaluation unit 440 evaluates a first correction image and a second correction image for each pixel. The evaluation unit 440 evaluates the first correction image by using a model error e. The smaller the model error e, the higher the accuracy of correction of the first correction image; the greater the model error e, the lower the accuracy of correction. In other words, the model error e is used as evaluation information in evaluating the first correction image.

Further, the evaluation unit 440 evaluates the second correction image by using a standard deviation of brightness values calculated for each small area. The evaluation unit 440 compares the standard deviation of brightness values calculated for each small area with its average value. The evaluation unit 440 then regards a difference between the standard deviation of a small area that is smaller than the average value and the average value as an estimate error of a pixel in a predetermined position (the center, for example) in the small area. Alternatively, the evaluation unit 440 may regard a difference calculated in this way as an estimate error common to the pixels in the small area. The evaluation unit 440 calculates such an estimate error for each pixel in the correction image by shifting the position of the small area. The estimate error and the model error e will hereinafter also be collectively referred to as "error information". It can be said that the error information corresponds to an example of "unlikelihood", which will be described later.

The evaluation unit 440 may calculate an evaluation value for each pixel in the first correction image and the second correction image. The evaluation value represents the image quality of a correction image by a value in the range from "0 (lowest)" to "10 (highest)", for example. Upon calculating such an evaluation value, the evaluation unit 440 provides the calculated evaluation value to the synthesis unit 450.

The synthesis unit 450 synthesizes the first correction image and the second correction image. The synthesis unit 450 generates a synthesized image based on a result of evaluation by the evaluation unit 440. In the present example embodiment, the synthesis unit 450 generates a synthesized image by performing weighted addition of the first correction image and the second correction image on a pixel-by-pixel basis. More specifically, the synthesis unit 450 performs weighted addition of gradation values of pixels corresponding to the same position in the first correction image and the second correction image by using a predetermined weighting coefficient.

For example, the synthesis unit 450 performs the weighted addition expressed by Equation (2) given below on a pixel-by-pixel basis.

$$x = ax_1 + (1-a)x_2 \quad (2)$$

Note that in Equation (2), x: spectrum information of each pixel of a synthesized image, $x_1$: spectrum information of each pixel of the first correction image, $x_2$: spectrum information of each pixel of the second correction image, and a: weighting coefficient.

Further, the pieces of spectrum information x, $x_1$, and $x_2$ are vectors that have as many elements as the number of bands. The weighting coefficient a is determined, for example, from an evaluation value for a given pixel of the first correction image and an evaluation value for a pixel of the second correction image that corresponds to the given pixel (i.e., the pixel corresponding to the same position). The weighting coefficient a is a numerical value that becomes closer to "1" as the pixel quality of the pixel of the first correction image gets higher, becomes closer to "0" when the quality of the pixel of the second correction image gets higher, and is equal to or greater than 0 and equal to or less than 1.

Figure 7:
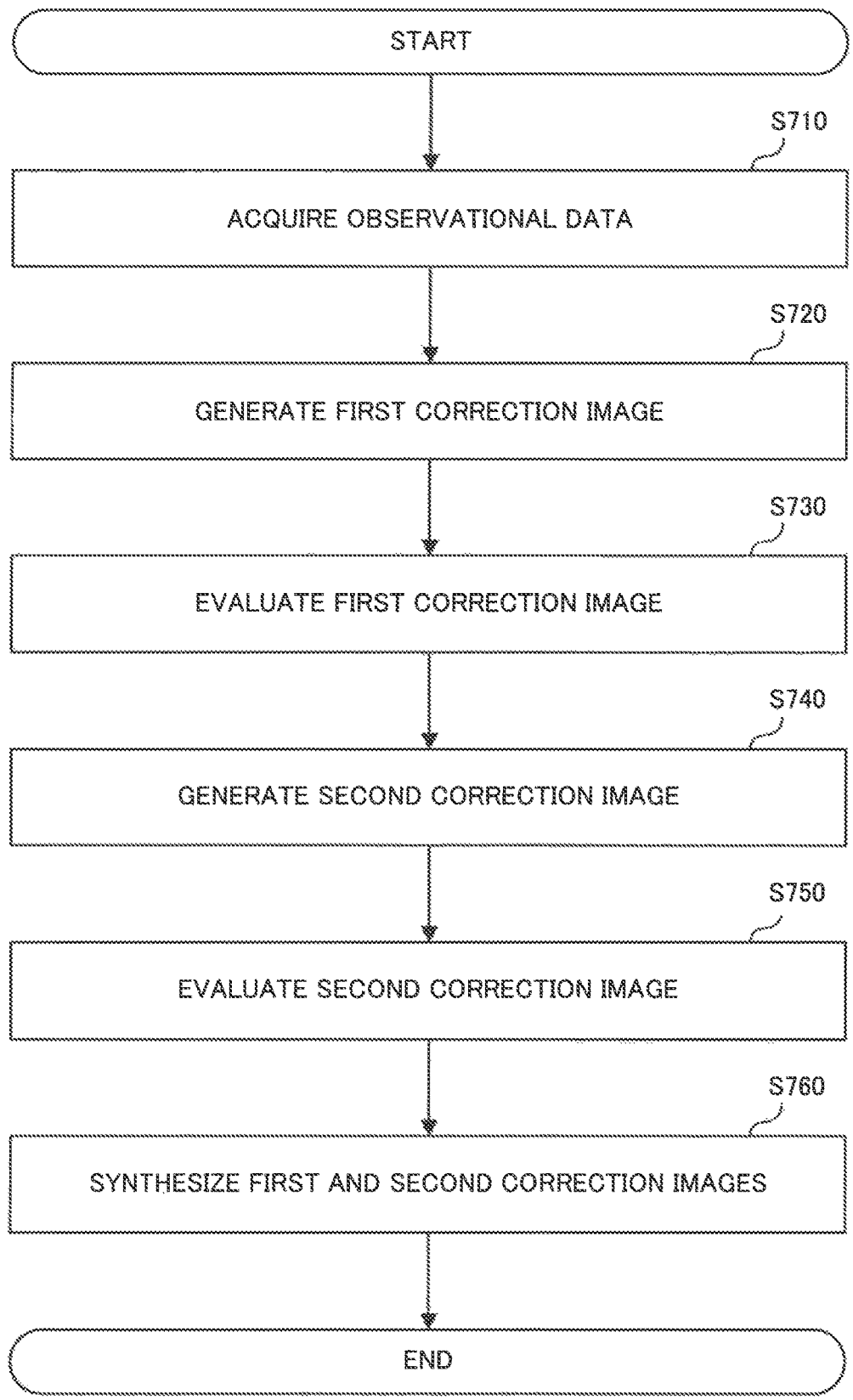
FIG. 7 is a flowchart illustrating another example of an image processing method.

FIG. 7 is a flowchart illustrating an image processing method according to the present example embodiment. The image processing device 320 executes processing according to a procedure following the flowchart illustrated in FIG. 7. However, the image processing device 320 may execute processing relating to the first correction image (steps S720 and S730) and processing relating to the second correction image (steps S740 and S750) in parallel or may execute processing relating to the second correction image before processing relating to the first correction image.

In step S710, the acquisition unit 410 acquires observational data. In step S720, the first correction unit 420 generates a first correction image based on the observational data acquired in step S710. In step S730, the evaluation unit 440 evaluates the first correction image generated in step S720.

In step S740, the second correction unit 430 generates a second correction image based on the observational data acquired in step S710. In step S750, the evaluation unit 440 evaluates the second correction image generated in step S740.

In step S760, the synthesis unit 450 synthesizes the first correction image generated in step S720 and the second correction image generated in step S740. The synthesis unit 450 synthesizes the pixels of the first correction image and the pixels of the second correction image on a pixel-by-pixel basis by using evaluation results in step S730 and step S750, The synthesis unit 450 outputs image data representing a synthesized image.

As describe above, the image processing system 300 according to the present example embodiment has a configuration that evaluates a first correction image and a second correction image for each pixel, based on error information and generates a synthesized image based on a result of the evaluation. With this configuration, the image processing system 300 can achieve advantageous effects similar to those of the image processing device 100 according to the first example embodiment.

Further, the image processing system 300 has a configuration that synthesizes correction images generated in accordance with correction methods based on the methods described in NPL 1 and NPL 2. As described above, the accuracy of correction by those methods may degrade in certain cases and effective images (or ineffective images) are different from method to method. The image processing system 300 is capable of making up for shortcomings of each of those methods by synthesizing correction images that are based on the methods.

Third Example Embodiment

Figure 8:
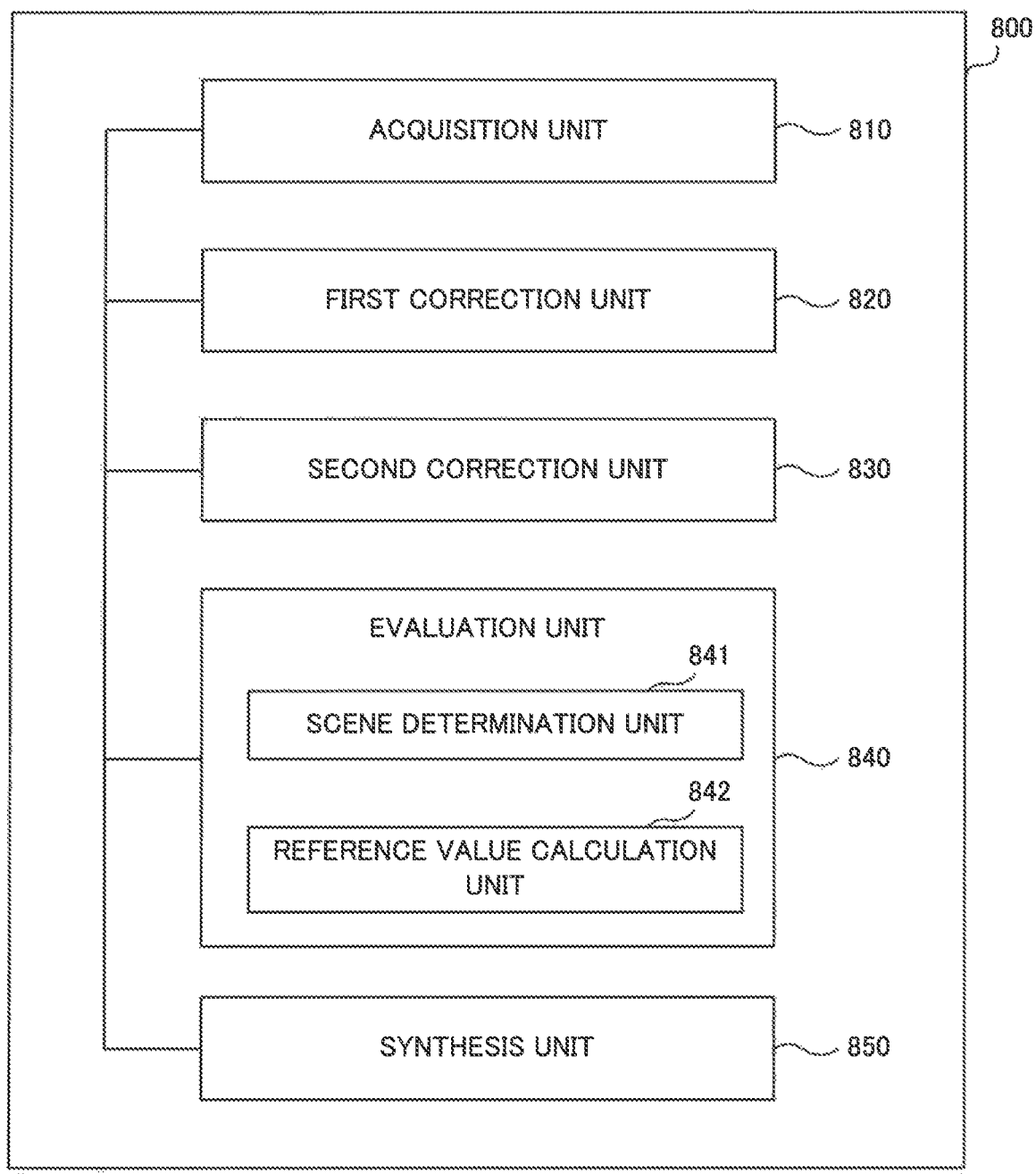
FIG. 8 is a block diagram illustrating a yet another example of a configuration of an image processing device.

FIG. 8 is a block diagram illustrating a configuration of an image processing device 800 according to yet another example embodiment. The image processing device 800 includes an acquisition unit 810, a first correction unit 820, a second correction unit 830, an evaluation unit 840, and a synthesis unit 850.

The image processing device 800 differs from the image processing device 320 according to the second example embodiment at least in the configuration of the evaluation unit 840 (in other words, the evaluation method). The other configuration of the image processing device 800 may be common with that of the image processing device 320 but specific methods for correcting an observation image may be different from those of the image processing device 320. For the convenience of explanation, it is assumed here that components of the image processing device 800 have configurations and functions similar to those of components of the image processing device 320 that have the same names, W except for features which will be described in detail below.

Objects evaluated by the evaluation unit 840 differ from objects evaluated by the evaluation unit 340. The evaluation unit 840 evaluates observation images instead of correction mages. More specifically, the evaluation unit 840 includes a scene determination unit 841 and a reference value calculation unit 842.

The scene determination unit 841 determines a scene of an observation image for each pixel. A scene herein is an attribute of a land cover, for example. The scene determination unit 841 can determine a scene of each pixel by using indices known in remote sensing. Such indices include a Normalized Difference Vegetation Index (NDVI), which relates to vegetation, a Normalized Difference Water Index (NDWI), which relates to water areas, Normalized Difference Soil Index (NDSI), which relates to soil, a Non-Homogeneous Feature Difference (NHFD), which relates to artificial objects (such as buildings), and the like. It can be said that the scene determination unit 841 includes the function of classifying each pixel of an observation image as any of predetermined number of scenes.

The reference value calculation unit 842 calculates a reference value that indicates unlikelihood of correction images for each correction image. Unlikelihood herein means the degree of unsuitableness of a correction image corrected by a given correction method for a certain scene. For example, it is known that the accuracy of correction by the methods described in NPLs 1 and 2 may degrade in certain scenes, as described above.

The reference value calculation unit 842 stores suitableness, which may be called affinity, of each of the correction methods of the first correction unit 820 and the second correction unit 830 with each scene in advance and calculates a reference value according to a scene determined by the scene determination unit 841. The reference value calculation unit 842 provides the synthesis unit 850 with a reference value calculated for each pixel of correction images.

The synthesis unit 850 synthesizes a first correction image and a second correction image, based on reference values of unlikelihood calculated by the evaluation unit 840. For example, the synthesis unit 850 performs weighted addition of pieces of spectrum information of pixels in such a way that a correction image corrected by using a correction method that better suits a scene determined by the scene determination unit 841 has a greater weight.

The synthesis unit 850 may synthesize a first correction image and a second correction image without using weighted addition. For example, the synthesis unit 850 may generate a synthesis image by assigning spectrum information of a pixel that corresponds to the pixel of the first correction image to a pixel of a scene suitable for the first correction image, and assigning spectrum information of a pixel that corresponds to the pixel of the second correction image to a pixel of a scene suitable for the second correction image.

As described above, the information processing device 800 according to the present example embodiment has a configuration that evaluates an observation image for each pixel and generates a synthesis image based on a result of the evaluation. With this configuration, the image processing device 800 can achieve advantageous effects similar to those of the image processing device 100 according to the first example embodiment. The image processing device 800 is capable of generating a synthesized image that better suits a scene of an observation image by synthesizing correction images based on a reference value of unlikelihood.

Fourth Example Embodiment

Figure 9:
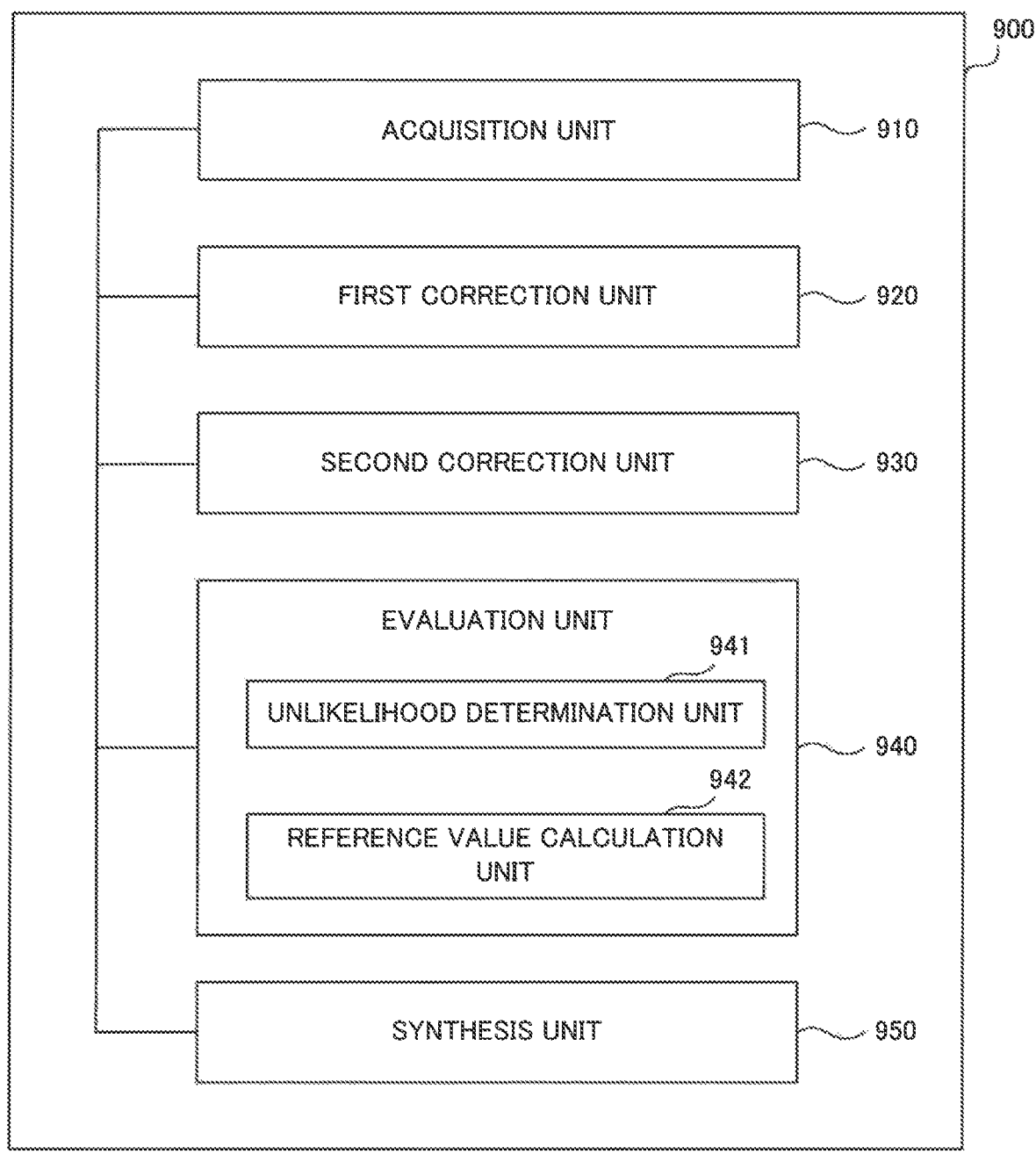
FIG. 9 is a block diagram illustrating a yet another example of a configuration of an image processing device.

FIG. 9 is a block diagram illustrating a configuration of an image processing device 900 according to yet another example embodiment. The image processing device 900 includes an acquisition unit 910, a first correction unit 920, a second correction unit 930, an evaluation unit 940, and a synthesis unit 950.

The image processing device 900 differs from the image processing device 800 according to the third example embodiment at least in the configuration of the evaluation unit 940. The other configuration of the image processing device 900 may be common with that of the image processing device 800 but specific methods for correcting an observation image may be different from those of the image processing device 800.

Objects evaluated by the evaluation unit 940 differ from objects evaluated by the evaluation unit 840. The evaluation unit 940 evaluates correction images instead of observation images. More specifically, the evaluation unit 940 includes an unlikelihood determination unit 941 and a reference value calculation unit 942.

The unlikelihood determination unit 941 determines unlikelihood of a first correction image and a second correction image, based on estimated cloud information. The cloud information herein is information representing a property of clouds. The cloud information can be estimated based on a cloud spectrum, cloud thickness, or a cloud component, for example.

The unlikelihood determination unit 941 determines at least one of unlikelihood of a cloud spectrum and unlikelihood of a cloud distribution feature. The unlikelihood determination unit 941 may use unlikelihood of a cloud spectrum and unlikelihood of a cloud distribution feature in combination.

For example, the unlikelihood determination unit 941 calculates, for each pixel, an error (difference) between an estimated cloud spectrum and a known typical cloud spectrum and uses the calculated error as unlikelihood. As an error herein, a Spectral Angle Mapper (SAM), a Root Mean Square Error (RMSE), an error sum of squares, or the like may be used.

The unlikelihood determination unit 941 may use, as unlikelihood, the magnitude of an error obtained when a model of a given cloud spectrum is fitted to an estimated cloud spectrum. It is assumed, for example, that a model of a cloud spectrum is represented as vector notation $\beta^M(X)$ of a spectrum that is dependent on p variational parameters $X=[X_1, X_2, \ldots, X_p]$. Here, the unlikelihood determination unit 941 calculates X that minimizes an error between an estimated cloud spectrum and $\beta^M(X)$ and uses the minimum error as unlikelihood.

A model of a cloud spectrum is expressed by Equations (3) to (5) given below, for example. The unlikelihood determination unit 941 may, use any of Equations (3) to (5) as a model of a cloud spectrum. Here, $\beta^M(\lambda_i, X)$ represents a value of $\beta^M(X)$ in a band $\lambda_i$. Further, $I(\lambda_i)$ represents irradiance of sunlight in outer space. Further, $\tau(\lambda_i)$ represents optical thickness due to scattering of air molecules in the band $\lambda_i$ and can be uniquely obtained from the band $\lambda_i$.

[Math. 2]

$$\beta^M(\lambda_i, X) = X_1 I(\lambda_1) \lambda_1^{-X_2} \tag{3}$$

[Math. 3]

$$\beta^M(\lambda_i, X) = X_1 I(\lambda_1)(1 - e^{-X_2 \lambda_1^{-X_2}}) \tag{4}$$

[Math. 4]

$$\beta^M(\lambda_i, X) = X_1 I(\lambda_i)(1 - e^{-(X_2 \lambda_4^{-X_3} + X_4 \tau(\lambda_4))}) \tag{5}$$

Further, the unlikelihood determination unit 941 calculates unlikelihood of a cloud distribution feature, based on a spatial distribution of cloud. For example, the unlikelihood determination unit 941 may use, as unlikelihood, the magnitude of a high-frequency component contained in a two-dimensional distribution of cloud that is identified based on cloud thickness or a cloud component (i.e., a sudden change in cloud thickness or a cloud component). The unlikelihood determination unit 941 can calculate unlikelihood of a cloud distribution feature by using a common filter (such as a Laplacian filter) used in edge detection and the like.

In general, a spatial distribution of clouds gradually changes. Therefore, a sudden change of spatial distribution of clouds represented by a correction image means that the distribution is unnatural. The unlikelihood determination unit 941 increases unlikelihood of a cloud distribution feature in such a case, thereby making unlikelihood of a more natural image relatively small.

The reference value calculation unit 942 calculates a reference value based on unlikelihood of a first correction image and unlikelihood of a second correction image determined by the unlikelihood determination unit 941. A specific method for calculating the reference value by the reference value calculation unit 942 is the same as the calculation method by the reference value calculation unit 842 according to the third example embodiment.

As described above, the image processing device 900 according to the present example embodiment has a configuration that evaluates a correction image for each pixel and generates a synthesized image based on a result of the evaluation. With this configuration, the image processing device 900 can achieve advantageous effects similar to those of the image processing device 100 according to the first example embodiment. The image processing device 900 is capable of making an image after correction more natural by synthesizing correction images, based on estimated cloud information.

[Variations]

The present disclosure is not limited to the first to fourth example embodiments described above. The present disclosure may include modes applied with variations or applications that can be grasped by those skilled in the art. For example, the present disclosure includes the variations described blow. Further, the present disclosure may also include modes implemented by combining matters described herein as appropriate. For example, matters described by using a certain example embodiment may also be applied to another example embodiment as long as no contradiction is caused.

(Variation 1)

Evaluation according to the present disclosure may be performed by combining a plurality of evaluation methods. For example, the image processing device 320 may determine unlikelihood by using each of the methods described in the second, third, and fourth example embodiments and may generate a synthesized image by performing weighted addition to results of the determinations.

(Variation 2)

Correction according to the present disclosure is not limited to correction of cloud. The correction according to the present disclosure is also applicable to correction of, for example, dust (such as yellow dust) in the atmosphere, fumes due to volcanic activity, smoke from fire, and the like in an observation image in a way similar to the way in which the clouds are corrected.

(Variation 3)

Specific hardware configurations of image processing devices according to the present disclosure include various variations and are not limited to specific configurations. For example, an image processing device according to the present disclosure may be implemented by using software or may be configured in such a way that a plurality of pieces of hardware are used to share various kinds of processing.

Figure 10:
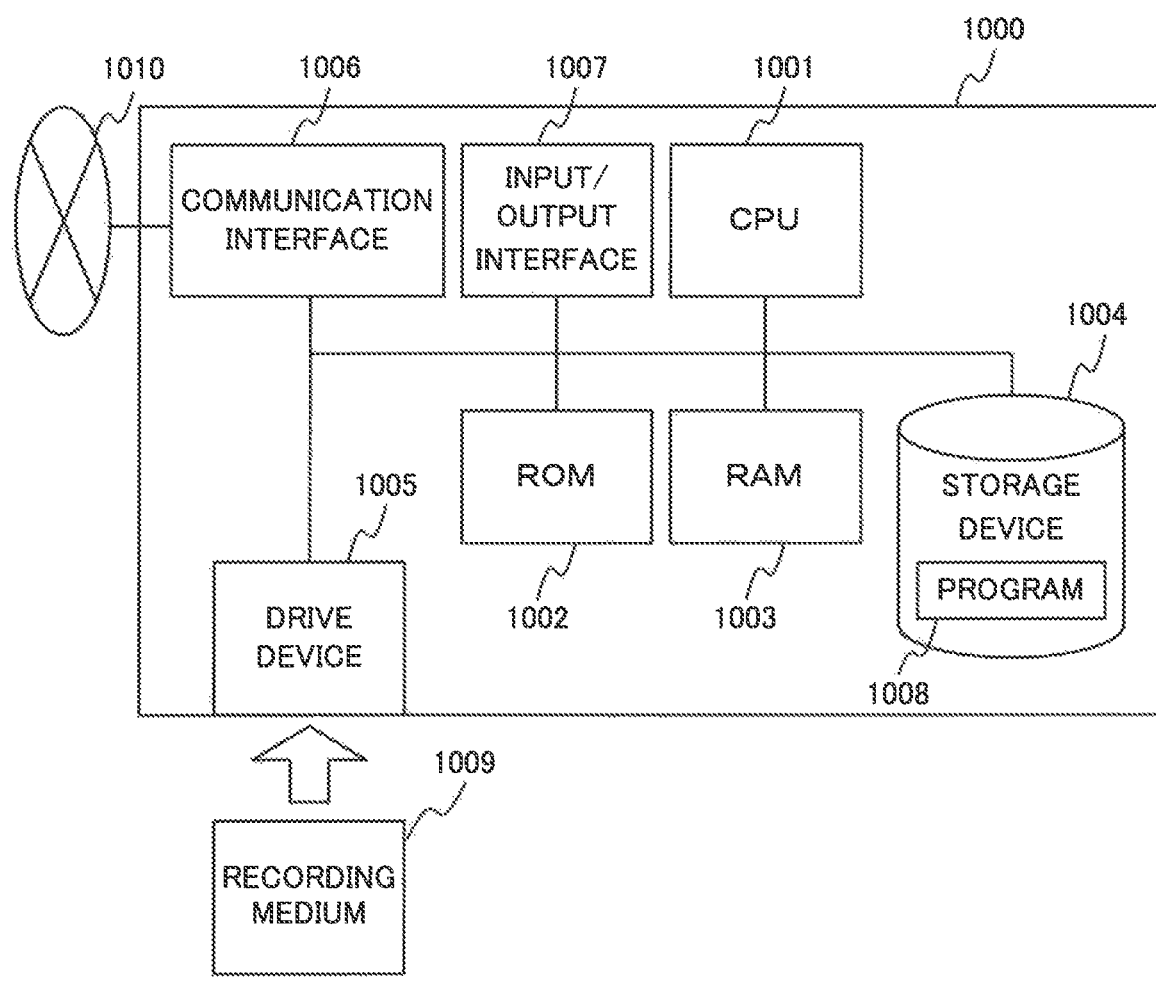
FIG. 10 is a block diagram illustrating an example of a hardware configuration of a computer device.

FIG. 10 is a block diagram illustrating an example of a hardware configuration of a computer device 1000 that implements an image processing device according to the present disclosure. The computer device 1000 includes a Central Processing Unit (CPU) 1001, a Read Only Memory (ROM) 1002, a Random Access Memory (RAM) 1003, a storage device 1004, a drive device 1005, a communication interface 1006, and an input/output interface 1007. The image processing device according to the present disclosure may be implemented by a configuration (or part of the configuration) illustrated in FIG. 10.

The CPU 1001 executes a program 1008 by using the RAM 1003. The program 1008 may be stored in the ROM 1002. Further, the program 1008 may be recorded on a recording medium 1009 such as a memory card and read out by the drive device 1005, or may be transmitted from an external device via a network 1010. The communication interface 1006 exchanges data with the external device via the network 1010. The input/output interface 1007 exchanges data with peripheral devices (such as an input device and a display device). The communication interface 1006 and the input/output interface 1007 are capable of functioning as components for acquiring or outputting data.

Note that components of an information processing device according to the present disclosure may be configured by a single piece of circuitry (such as a processor) or may be configured by a combination of a plurality of pieces of circuitry. The circuitry herein may be any of special-purpose circuitry or general-purpose circuitry. For example, a part of an image processing device according to the present disclosure may be implemented by a special-purpose processor and the other part of the image processing device may be implemented by a general-purpose processor.

A configuration described as a single device in the example embodiments described above may be provided in a distributed manner among a plurality of devices. For example, the image processing device 100, 320, 800, or 900 may be implemented by a plurality of computer devices by using a cloud computing technique or the like.

As above, the present invention has been described based on the exemplary embodiments. An exemplary embodiment is just an illustration, and various kinds of changes, addition or subtraction and combinations may be added to each of the above-mentioned exemplary embodiments unless it deviates from the main points of the present invention. It is understood by a person skilled in the art that modification made by adding such changes, addition/subtraction and combinations are also included in the scope of the present invention.

While the present invention has been described with reference to example embodiments, the present invention is not limited to the example embodiments described above. Various modifications that can be understood by those skilled in the art can be made to configurations and details of the present invention within the scope of the present invention.

This application is based upon and claims the benefit of priority from Japanese Patent Application No. 2016-165819, filed on Aug. 26, 2016, the entire disclosure of which is incorporated herein.

REFERENCE SIGNS LIST

100, 320, 800, 900 image processing device
110 Correction unit
120, 840, 940 Evaluation unit
130, 450, 850, 950 Synthesis unit
300 Image processing system
310 Image provision device
320 Image processing device
330 Output device 410, 810, 910 Acquisition unit
420, 820, 920 First correction unit
430, 830, 930 Second correction unit
440 Evaluation unit
1000 Computer device

The invention claimed is:

1. An image processing device comprising:
a memory for storing instructions; and
a processor that, when executing the instructions, perform a method, the method comprising:
generating a plurality of correction images from an image by using a plurality of correction methods;
calculating, based on cloud information representing a property of clouds, a reference value corresponding to a scene of the image that indicates unlikelihood, the unlikelihood being a degree of unsuitableness of each of the plurality of correction images for the scene of the image; and
synthesizing the plurality of correction images, based on the reference value for each of the plurality of correction images.

2. The image processing device according to claim 1, wherein the method further comprises:
synthesizing the plurality of correction images by performing weighted addition for each of the areas.

3. The image processing device according to claim 1, wherein the method further comprises:
determining a scene of the image for each of the areas; and
synthesizing the plurality of correction images, based on the determined scene.

4. The image processing device according to claim 1, wherein the method further comprises:
evaluating an unlikelihood of the plurality of correction images for each of the areas; and
synthesizing the plurality of correction images, based on the evaluated unlikelihood of the plurality of correction images.

5. The image processing device according to claim 4, wherein:
the image is an observation image of a ground surface that sometimes contains cloud; and
the method further comprises evaluating each of the plurality of correction images for each of the areas, based on information representing a property of cloud that is estimated from each of the plurality of correction images.

6. The image processing device according to claim 1, wherein
each of the areas is a pixel.

7. An image processing method comprising:
generating a plurality of correction images from an image by using a plurality of correction methods;
calculating, based on cloud information representing a property of clouds, a reference value corresponding to a scene of the image that indicates unlikelihood, the unlikelihood being a degree of unsuitableness of each of the plurality of correction images for the scene of the image; and
synthesizing the plurality of correction images, based on the reference value for each of the plurality of correction images.

8. A non-transitory computer-readable recording medium on which a program is stored, the program causing a computer to execute:
processing of generating a plurality of correction images from an image by using a plurality of correction methods;
processing of calculating, based on cloud information representing a property of clouds, a reference value corresponding to a scene of the image that indicates unlikelihood, the unlikelihood being a degree of unsuitableness of each of the plurality of correction images for the scene of the image; and
processing of synthesizing the plurality of correction images, based on the reference value for each of the plurality of correction images.

* * * * *